(12) United States Patent
Hashimoto et al.

(10) Patent No.: US 8,320,831 B2
(45) Date of Patent: Nov. 27, 2012

(54) ELECTRONIC DEVICE AND COMMUNICATION CONTROL METHOD

(75) Inventors: Ayumi Hashimoto, Ome (JP); Hideki Ohkita, Kunitachi (JP); Hideyuki Nakagawa, Koganei (JP); Satoshi Odakura, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/315,254

(22) Filed: Dec. 8, 2011

(65) Prior Publication Data

US 2012/0083214 A1 Apr. 5, 2012

Related U.S. Application Data

(63) Continuation of application No. 12/723,406, filed on Mar. 12, 10.

(30) Foreign Application Priority Data

Apr. 15, 2009 (JP) ................................. 2009-099056

(51) Int. Cl.
*H04B 5/00* (2006.01)
(52) U.S. Cl. ...................................... 455/41.1; 455/41.2
(58) Field of Classification Search .................. 455/41.2, 455/41.1
See application file for complete search history.

(56) References Cited

U.S. PATENT DOCUMENTS

| 4,945,533 | A  | * | 7/1990  | Schroeder et al. ............. 370/287 |
| 7,539,631 | B1 | * | 5/2009  | El-Haj .......................... 705/26.1 |
| 2006/0044153 | A1 | * | 3/2006  | Dawidowsky ............ 340/825.22 |
| 2006/0094356 | A1 | * | 5/2006  | Dawidowsky ................ 455/41.1 |
| 2008/0096499 | A1 | * | 4/2008  | Amtmann et al. .......... 455/127.5 |
| 2008/0126560 | A1 | * | 5/2008  | Takayama et al. ............. 709/233 |
| 2008/0272889 | A1 | * | 11/2008 | Symons ........................ 340/10.1 |

FOREIGN PATENT DOCUMENTS

| JP | 2001-077878 | 3/2001 |
| JP | 2004-088172 | 3/2004 |
| JP | 3863122     | 10/2004 |
| JP | 2008-104088 | 5/2008 |
| JP | 2008-123203 | 5/2008 |
| JP | 2010-050652 | 3/2010 |

OTHER PUBLICATIONS

Japanese Office Action dated Jun. 8, 2010 from counterpart Japanese Patent Application No. 2009-099056.

* cited by examiner

*Primary Examiner* — Temesghen Ghebretinsae
*Assistant Examiner* — Gennadiy Tsvey
(74) *Attorney, Agent, or Firm* — Patterson & Sheridan, LLP

(57) ABSTRACT

According to one embodiment, an electronic device includes a communication module, a connection establishment module, a negotiation module, a service execution module, and an execution control module. The communication module executes close proximity wireless transfer. The connection establishment module establishes a connection between the communication module and an external device which are in a close proximity state. The negotiation module determines a service to be executed between the communication module and the external device through a negotiation process when the connection is established. The service execution module executes the service. The execution control module executes the negotiation process again in response to a user's request or a request from the external device if the connection is kept after the completion of the service.

7 Claims, 13 Drawing Sheets

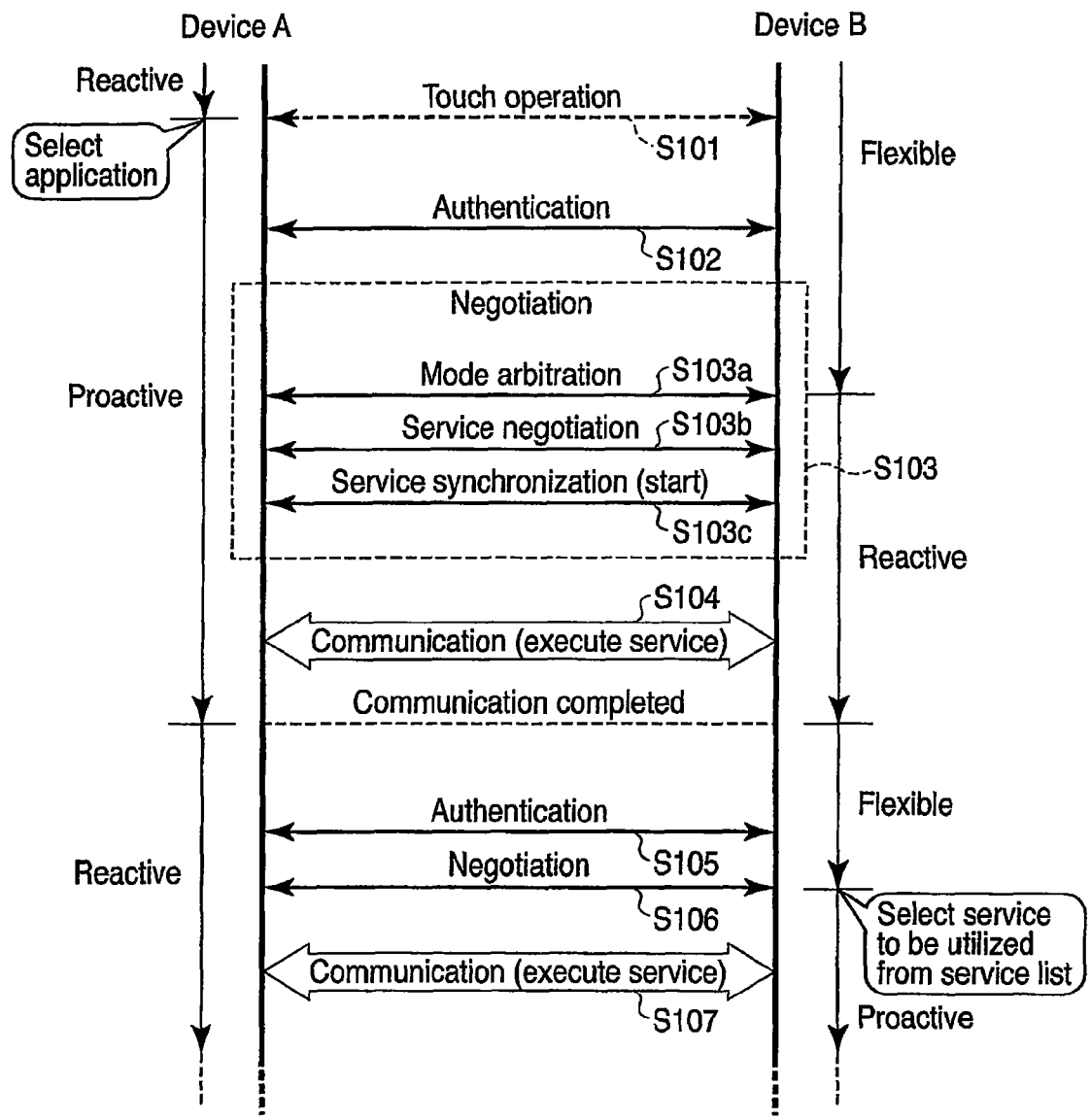
F I G. 6

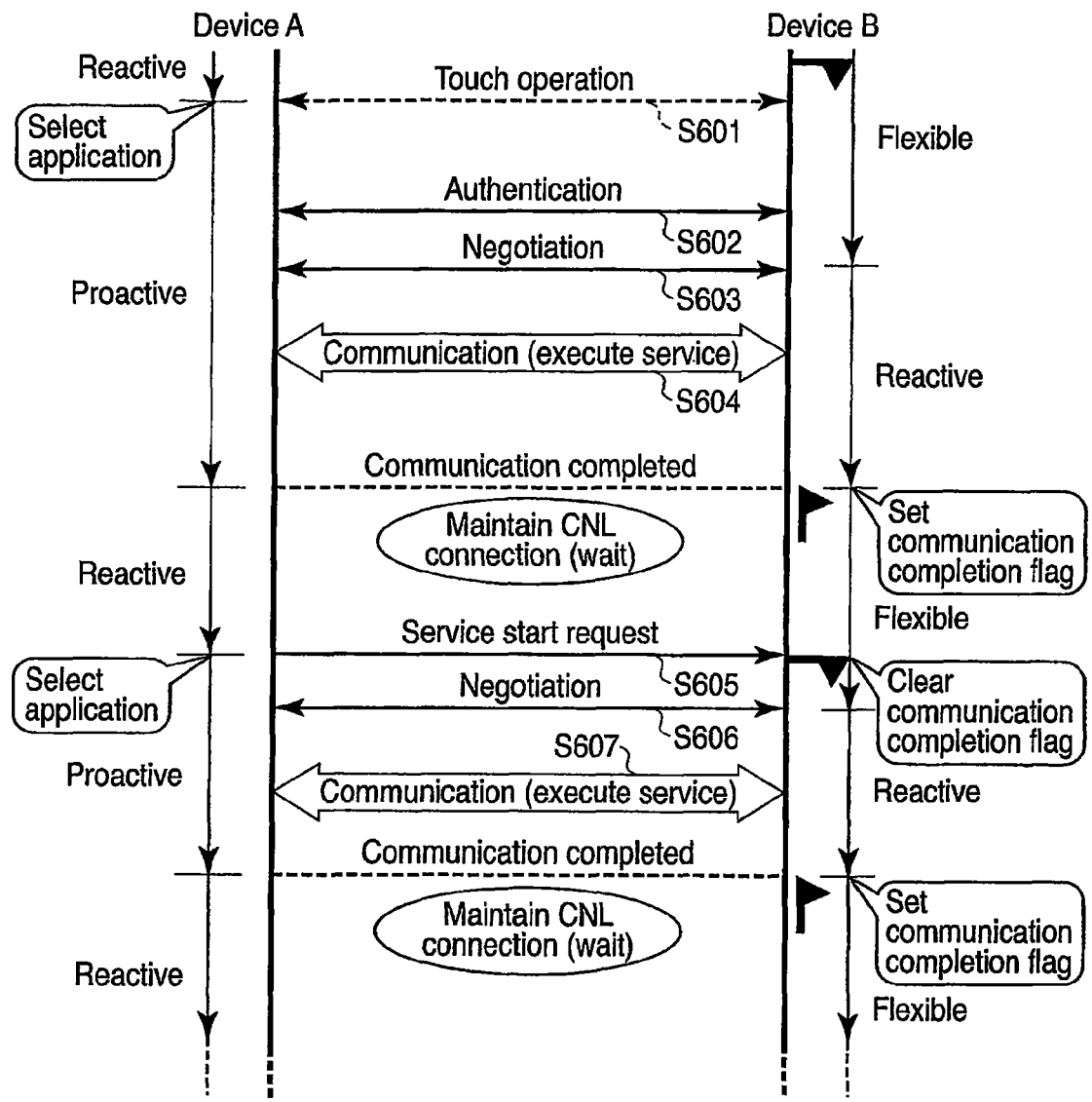
F I G. 11

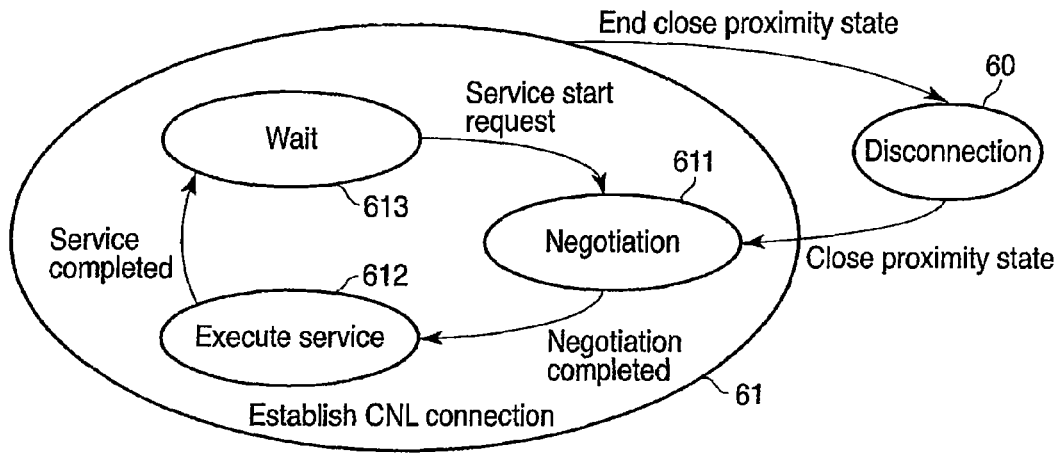
F I G. 12
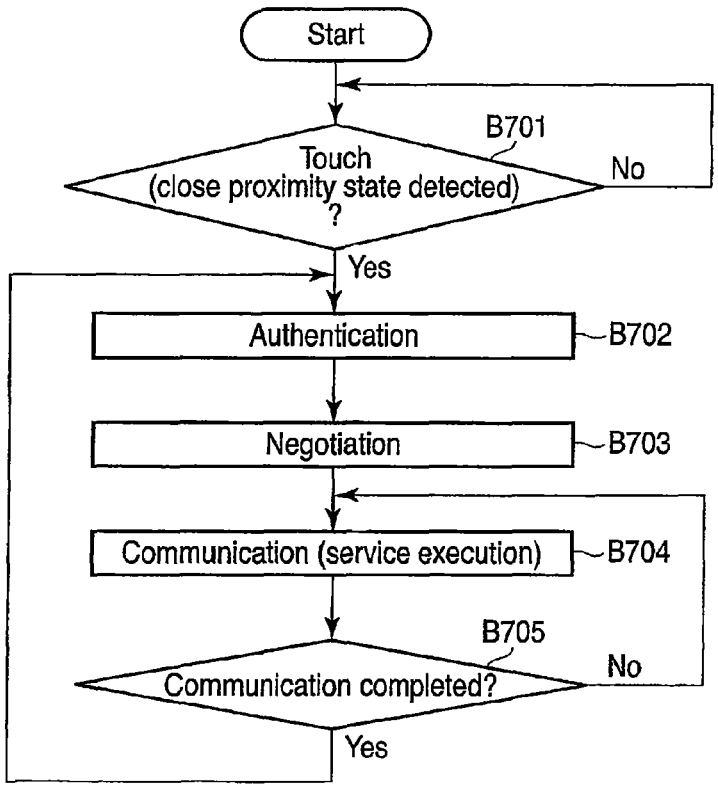
F I G. 14

|  | | Device A | | |
|---|---|---|---|---|
| | | Initiator proactive | Initiator flexible | Responder reactive |
| Device B | Initiator proactive | Collision (error) | Execute service specified by device B | Execute service specified by device B |
| | Initiator flexible | Execute service specified by device A | Collision (error) | Execute service specified by device B (without user operation) |
| | Responder reactive | Execute service specified by device A | Execute service specified by device A (without user operation) | |

F I G. 13

ELECTRONIC DEVICE AND COMMUNICATION CONTROL METHOD

CROSS-REFERENCE TO RELATED APPLICATIONS

This application is a continuation of U.S. patent application Ser. No. 12/723,406, filed Mar. 12, 2010, which is based upon and claims the benefit of priority from Japanese Patent Application No. 2009-099056, filed Apr. 15, 2009, the entire contents of which are incorporated herein by reference.

BACKGROUND

1. Field

One embodiment of the invention relates to an electronic device communicating according to a close proximity wireless transfer scheme and a communication control method applied to the electronic device.

2. Description of the Related Art

In recent years, wireless communication such as NFC has come into use for IC cards, mobile phones, and the like. A user can easily carry out communication for an authentication process, billing and settlement process, and the like, simply by performing an operation of holding the IC card or mobile phone over a reader/writer module of a host apparatus.

Jpn. Pat. Appln. KOKAI Publication No. 2008-104088 discloses a wireless communication device managing communication such that if applications utilizing short-distance wireless communication are simultaneously executed, the applications can utilize the short-distance wireless communication without being terminated to release communication resources.

For the close proximity wireless transfer scheme, there is a demand to allow execution of a service to be automatically started simply by bringing the devices close to each other. If the execution of a service is started by bringing the devices close to each other, then for example, simply bringing a mobile phone close to a personal computer allows implementation of the function of synchronously backing up data stored in the mobile phone to the personal computer. That is, when it is detected that the devices are in a close proximity state, a service can be automatically executed through negotiation.

However, after the execution of the service is completed, if the service is automatically executed again while the devices are left in the close proximity state, the service unexpected by the user may be executed. Furthermore, when the unexpected service is executed, the user has to perform an operation to stop the service. The operation is inconvenient for the user.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary sequence diagram showing an example of the close proximity wireless transfer between the devices;

FIG. 11 is an exemplary diagram showing still another example of the close proximity wireless transfer performed between the electronic device of the embodiment and the external device;

FIG. 12 is an exemplary state transition diagram showing an example of the state transition of the close proximity wireless transfer by the electronic device of the embodiment;

FIG. 13 is an exemplary diagram illustrating a service provided between the electronic device of the embodiment and the external device;

FIG. 14 is an exemplary flowchart showing the procedure of a close proximity wireless transfer process executed by a device communicating according to a close proximity wireless transfer scheme.

DETAILED DESCRIPTION

Various embodiments according to the invention will be described hereinafter with reference to the accompanying drawings. In general, according to one embodiment of the invention, there is provided an electronic device comprising: a communication module configured to execute close proximity wireless transfer; a connection establishment module configured to establish a connection between the communication module and an external device which are in a close proximity state; a negotiation module configured to determine a service to be executed between the communication module and the external device through a negotiation process when the connection is established; a service execution module configured to execute the service; and an execution control module configured to execute the negotiation process again in response to a user's request or a request from the external device if the connection is kept after the completion of the service.

Figure 1:
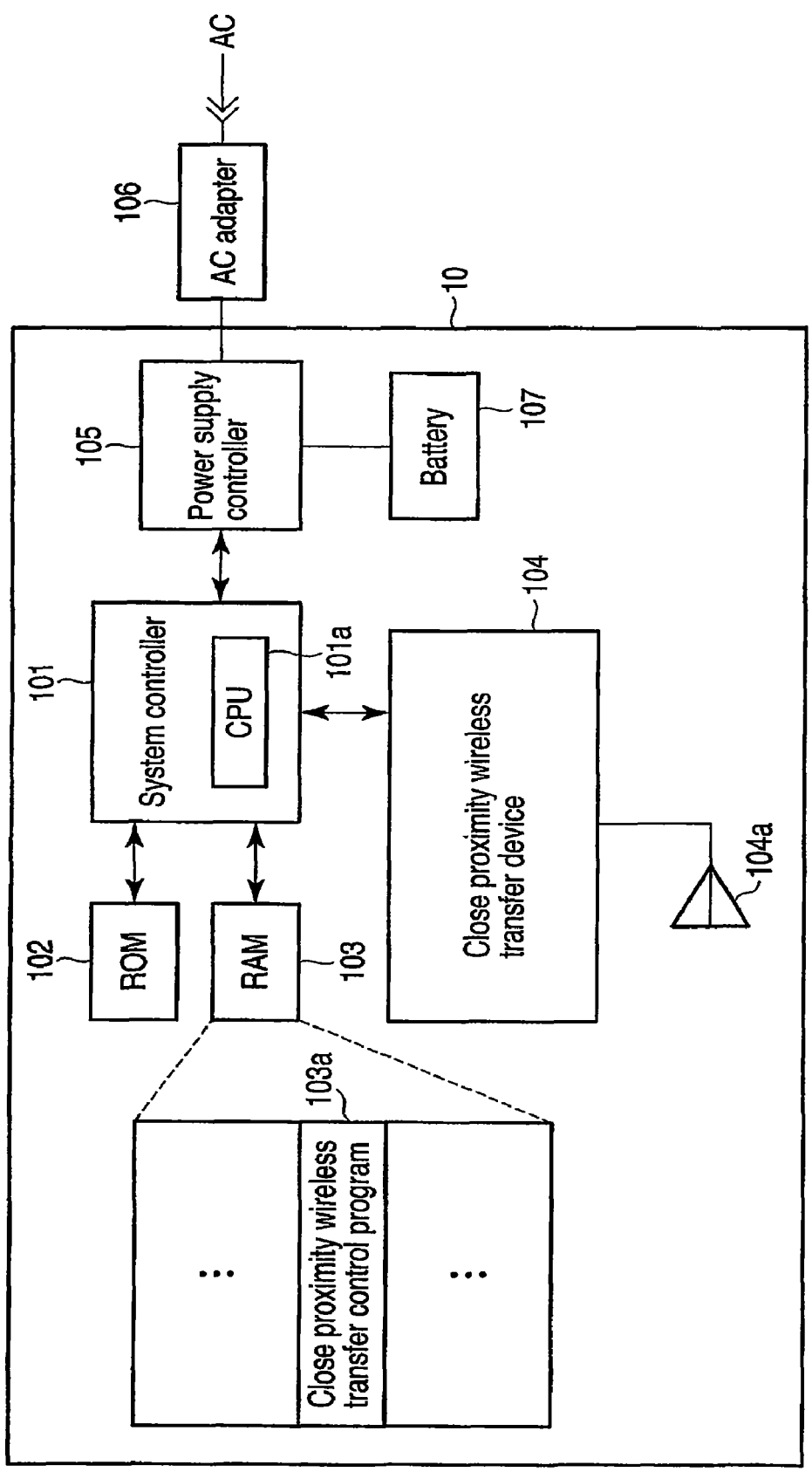
FIG. 1 is an exemplary block diagram showing the system configuration of an electronic device according to an embodiment of the present invention.

FIG. 1 shows the configuration of an electronic device according to an embodiment of the present invention. The electronic device 10 is implemented as, for example, a portable device (for example, a mobile phone, PDA, or audio player), a personal computer, or a consumer device (for example, a TV or video recorder). The electronic device 10 includes a system controller 101, a ROM 102, a RAM 103, a close proximity wireless transfer device 104, a power supply controller 105, an AC adapter 106, and a battery 107.

The system controller 101 controls the operation of each module in the electronic device 10. The system controller 101 includes a CPU 101a and is connected to the ROM 102, RAM 103, close proximity wireless transfer device 104, and power supply controller 105.

The CPU 101a is a processor loading commands and data in the ROM 102 to execute required processing. A close proximity wireless transfer control program 103a is loaded into the RAM 103 to control close proximity wireless transfer. The CPU 101a executes the close proximity wireless transfer control program 103a loaded into the RAM 103 to control the close proximity wireless transfer device 104.

The close proximity wireless transfer device 104 is a communication module performing close proximity wireless transfer. The close proximity wireless transfer device 104 establishes a wireless connection with another device (external device) which is present within a predetermined distance with respect to the close proximity wireless transfer device 104 and which has a close proximity wireless transfer function. The close proximity wireless transfer between the close proximity wireless transfer device 104 and the external device is of a peer-to-peer type. A communicable distance is, for example, 3 cm. A wireless connection can be established between the close proximity wireless transfer device 104 and the external device only when the close proximity wireless transfer device and the external device are in a close proximity state, that is, when the distance between the close proximity wireless transfer device 104 and the external device is at most the communicable distance (for example, 3 cm). When the close proximity wireless transfer device 104 and the external device are located within the communicable distance, a wireless connection is established between the close proximity wireless transfer device 104 and the external device. Then, for example, data such as a file specified by the user or a synchronization target file is transmitted between the close proximity wireless transfer device 104 and the external device.

Close proximity wireless communication uses induction electric field. For example, TransferJet is a close proximity wireless transfer scheme utilizing UWB to allow data to be transferred at high speed.

The close proximity wireless transfer device 104 is connected to an antenna 104a. The antenna 104a is an electrode called a coupler that transmits data to and receives data from the external device via wireless signals using induction electric field. When the external device is located within the communicable distance (for example, 3 cm) of the antenna 104a, the antenna (coupler) of the close proximity wireless transfer device 104 and the external device are coupled via induction electric field. Thus, wireless communication can be established between the close proximity wireless transfer device 104 and the external device. The close proximity wireless transfer device 104 and the antenna 104a can be implemented as one module.

The power supply controller 105 supplies each module in the electronic device 10 with power supplied externally via an AC adapter 106 or power from a battery 107. In other words, the electronic device 10 is driven by an external power source such as an AC commercial power supply or the battery 107. The AC adapter 106 can be provided in the electronic device 10.

Now, a software architecture controlling close proximity wireless transfer executed using the close proximity wireless transfer device 104 will be described with reference to FIG. 2.

Figure 2:
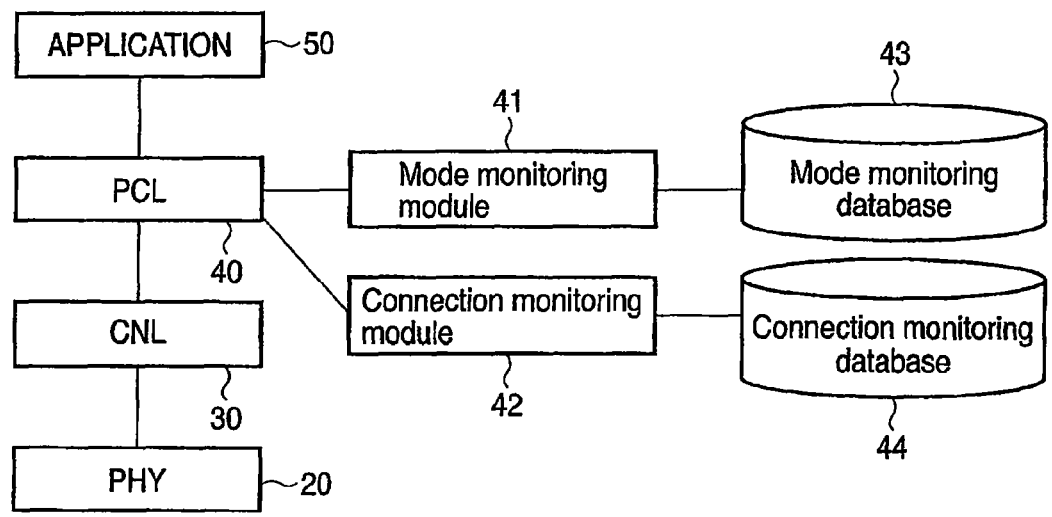
FIG. 2 is an exemplary diagram showing an example of a software architecture controlling close proximity wireless transfer and applied to the electronic device according to the embodiment.

The software architecture shown in FIG. 2 corresponds to the layered structure of a protocol stack controlling close proximity wireless transfer. The protocol stack is composed of a physical layer (PHY) 20, a connection layer (CNL) 30, a protocol conversion layer (PCL) 40, and an application layer 50. For example, the CNL 30, PCL 40, and application layer 50 can be implemented by a communication control program 103a.

The PHY 20 controls physical data transfer and corresponds to the physical layer in the OSI reference model. Some or all of the functions of the PHY 20 can also be implemented using hardware in the close proximity wireless transfer device 104.

The PHY 20 converts data from the CNL 30 into a wireless signal. The CNL 30 corresponds to the data link layer, the network layer and the transport layer in the OSI reference model. The CNL 30 controls the PHY 20 to allow data to be communicated. In response to a connection request from the PCL 40 or a connection request from the external device, the CNL 30 executes a process for establishing a connection (CNL connection) between the close proximity wireless transfer device 104 and external device arranged in a close proximity state.

The PCL 40 corresponds to the session layer and the presentation layer in the OSI reference model. The PCL 40 is positioned between the application layer 50 and the CNL 30 controlling establishment and termination of the connection between devices A and B. The PCL 40 controls each application (communication program) in the application layer 50 and the CNL 30.

More specifically, the PCL 40 executes a conversion process for converting data (user data) corresponding to an application protocol (for example, SCSI, OBEX, or another general-purpose protocol) handled by each communication program in the application layer 50, into a particular transmission data format. The conversion process enables data transmitted or received by any communication program to be converted into packets (data in the particular transmission data format) that can be handled by the CNL 30. The PCL 40 enables various application protocols to be utilized for close proximity wireless transfer.

Furthermore, the PCL 40, for example, executes a process of transmitting/receiving service information (information indicating services that can be executed by each device) and session information (information on sessions to be established or terminated) to/from a communication target device, starts an application, and manages connections and sessions.

The application layer 50 includes communication programs (applications) corresponding to several application protocols such as SCSI, OBEX, and other general-purpose protocols. Each application executes a process of requesting the PCL 40 to start and end a session, and a process of transmitting and receiving data to and from the PCL 40.

Furthermore, the PCL 40 includes, for example, a mode monitoring module 41, a connection monitoring module 42, a mode monitoring database 43, and a connection monitoring database 44.

The connection monitoring module 42 monitors the connection (CNL connection) between the electronic device 10 and external device arranged in a close proximity state. As described above, in response to a connection request from the PCL 40 or a connection request from the external device, the CNL 30 executes the process for establishing a connection between the electronic device 10 and external device arranged in the close proximity state. Furthermore, the connection between the electronic device 10 and the external device is terminated in response to cancellation of the close proximity state by the user's request for disconnection or separation of the electronic device 10 from the external device. The connection monitoring module 42 monitors the establishment and termination of the connection. The connection monitoring module 42 stores information indicating that the electronic device 10 and the external device are connected or disconnected to or from, in the connection monitoring database 44.

The mode monitoring module 41 monitors a mode set for the PCL 40. One of proactive mode, reactive mode, and flexible mode is set for the PCL 40.

In proactive mode, the electronic device 10 transmits a service start request to the external device. The device set to proactive mode functions as a master, and can control the communication target device to allow a service such as the data transfer between the devices to be executed. In reactive mode, the electronic device 10 receives a service start request transmitted by the external device. The device set to reactive mode functions as a slave and can perform such as the data transfer between the devices under the control of the communication target device.

A default mode for a portable device such as a mobile phone that cannot be driven by an external power source is set to reactive mode in order to reduce power consumption. When the user executes an application on the portable device, the portable device automatically changes from reactive mode to proactive mode.

The device set to proactive mode transmits a connection request signal. On the other hand, the device in reactive mode does not request any connection request signal and thus consumes relatively little power.

Flexible mode changes to proactive mode or reactive mode depending on the mode (proactive or reactive) set for the external device arranged in a close proximity state with the electronic device 10. Through negotiation with the external device arranged in the close proximity state, the electronic device 10 set to flexible mode changes to reactive mode if the external device is in proactive mode. If the external device is in reactive mode, the electronic device 10 changes to proactive mode. That is, the electronic device 10 set to flexible mode switchably functions as the master or the slave depending on the mode set for the communication target device. The change to proactive mode or reactive mode is carried out, for example, after a connection is established between the devices.

The default mode set for a device such as a personal computer which can be driven by an external power source such as an AC adapter power source is flexible mode. The device set to flexible mode transmits a connection request signal. Thus, even if the user places a mobile phone in proximity with respect to a personal computer (device in flexible mode) without executing any application in the mobile phone, a connection can be established between the devices. Thus, under the control of the personal computer, a service such as transfer of a data file can be provided to the user.

If a service is executed between the device set to proactive mode (device changed to proactive mode) and the device set to reactive mode (device changed to reactive mode), a service specified by the device set to proactive mode is executed between the two devices. When the execution of the service is completed, the device changed from reactive mode to proactive mode returns to reactive mode. The device changed from flexible mode to proactive mode or the device changed from flexible mode to reactive mode returns to flexible mode, when the execution of the service is completed.

The mode monitoring module 41 stores information indicating the current mode of the PCL 40, in the mode monitoring database 43. Thus, if the PCL 40 of the electronic device 10 changes to proactive mode or reactive mode through negotiation with the external device arranged in the close proximity state, the mode monitoring database 43 is updated with information indicating one of the modes to which the PCL 40 has changed.

PCL 40 monitors the connection (CNL connection) between the electronic device 10 and the external device and the mode set for the PCL 40, and controls each application (communication program) in the application layer 50 and the CNL 30.

Figure 3:
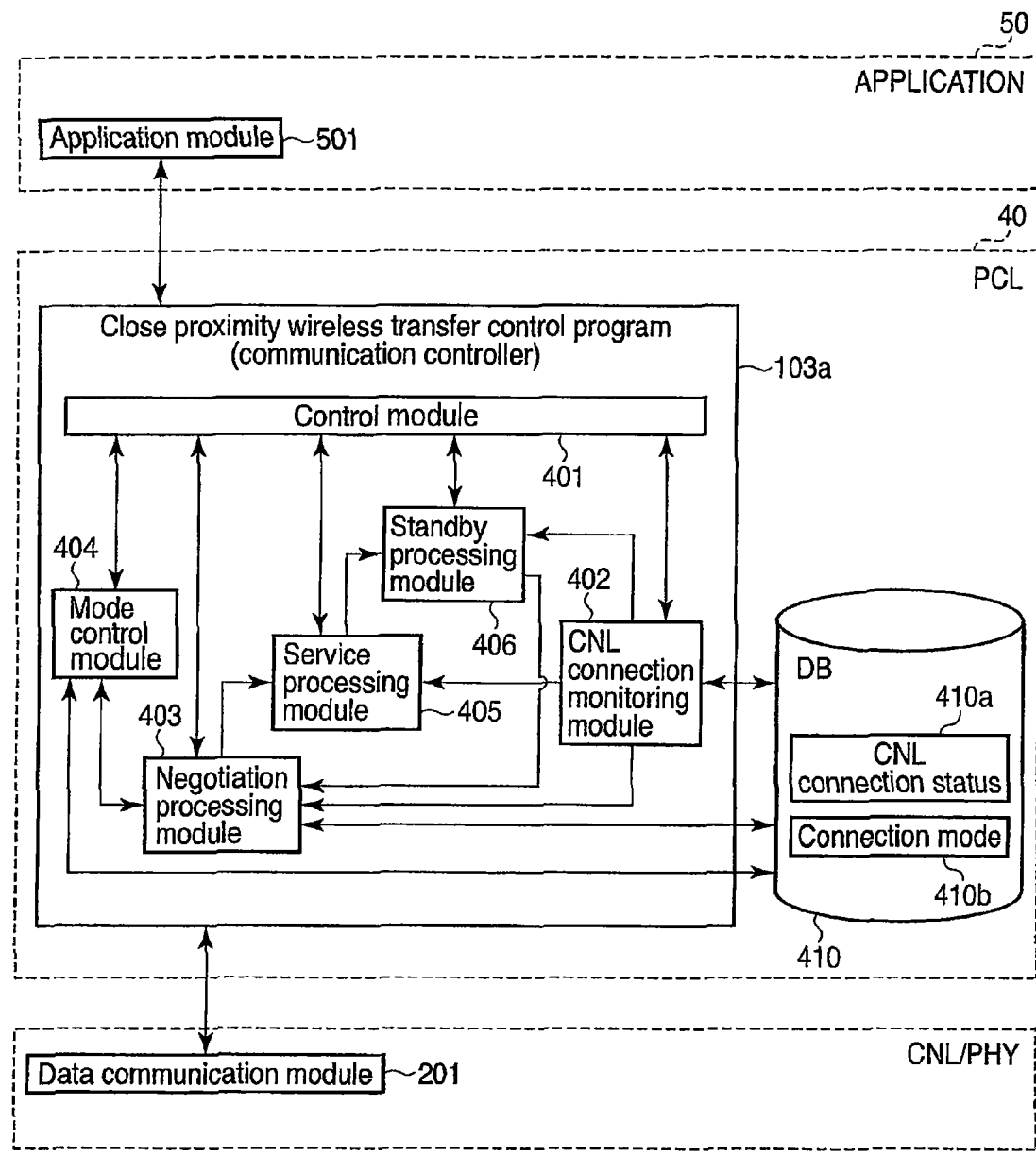
FIG. 3 is an exemplary block diagram showing an example of the configuration of a protocol conversion layer in the software architecture in FIG. 2.

FIG. 3 is a block diagram showing an example of the functional configuration of the close proximity wireless transfer device control program 103a implementing the functions of the PCL 40 described above.

As shown in FIG. 3, the close proximity wireless transfer control program 103a includes a control module 401, a CNL connection monitoring module 402, a negotiation processing module 403, a mode control module 404, a service processing module 405, and a standby processing module 406. The close proximity wireless transfer control program 103a is connected to a database 410. The database 410 is a storage device for a CNL connection status 410a that is information indicative of the connection status between the electronic device 10 and the external device, and a connection mode 410b that is information indicative of the connection mode set for the PCL 40 of the electronic device 10 and the connection mode set for the PCL of the external device.

The control module 410 controls the sequence of communication between the electronic device 10 and the external device. That is, the control module 401 controls each module in the close proximity wireless transfer control program 103a in response to requests or notifications from an application module 501 corresponding to the application layer 50 and the data communication module 201 corresponding to the CNL 30 and the PHY 20.

The CNL connection monitoring module 402 monitors the connection (CNL connection) between the electronic device 10 and the external device established by the CNL 30. When the CNL 30 establishes a connection between the close proximity wireless transfer device 104 and the external device, the CNL connection monitoring module 402 stores, in the CNL connection status 410a in the database 410, information indicating that a CNL connection has been established. Furthermore, when the connection between the electronic device 10 and the external device established by the CNL 30 is terminated, the CNL connection monitoring module 402 stores, in the CNL connection status 410a in the database 410, information indicating that the CNL connection has been terminated.

The CNL connection monitoring module 402 notifies the establishment or termination of the CNL connection to each module of the close proximity wireless transfer control program 103a. If the termination of the CNL connection is notified, the negotiation processing module 403, the mode control module 404, the service processing module 405, and the standby processing module 406 interrupt processing in execution. In other words, the negotiation processing module 403, the mode control module 404, the service processing module 405, and the standby processing module 406 execute processing while the CNL connection is active.

Upon receiving a notification indicating that the CNL connection has been established, from the CNL connection monitoring module 402, the negotiation processing module 403 executes a negotiation process. The negotiation processing module 403, for example, arbitrates the mode to be set for the PCL 40, determines a service to be executed between the devices, and synchronizes the service as a negotiation process.

In the arbitration of the mode set for the PCL 40, the negotiation processing module 403 determines the mode to be set for the PCL 40 of the electronic device 10 depending on the mode set for the communication target device. As described above, one of proactive mode, reactive mode, and flexible mode is set for the PCL 40. Furthermore, when a service is executed between the two devices, one of the devices has to be set to proactive mode in which the device transmits a service start request to the communication target device. The other device has to be set to reactive mode in which the device receives and responds to the service start request.

If the PCL 40 of the electronic device is set to proactive mode and the PCL 40 of the communication target device is set to reactive mode or if the PCL 40 of the electronic device is set to reactive mode and the PCL 40 of the communication target device is set to proactive mode, the negotiation processing module 403 does not change the mode to be set for the PCL 40.

If the PCL 40 of the electronic device is set to flexible mode, the negotiation processing module 403 selects either proactive mode or reactive mode depending on the mode set for the PCL 40 of the communication target device. That is, if the PCL 40 of the communication target device is set to proactive mode, the negotiation processing module 403 selects reactive mode as the one to be set for the PCL 40 of the electronic device. Furthermore, if the PCL 40 of the communication target device is set to reactive mode, the negotiation processing module 403 selects proactive mode as the one to be set for the PCL 40 of the electronic device. The negotiation processing module 403 notifies the mode control module 404 of the selected mode.

The mode control module 404 controls the mode set for the PCL 40 in cooperation with the negotiation processing module 403. The mode control module 404 sets the mode determined by the negotiation processing module 403, for the PCL 40.

Information indicative of the mode set for the PCL 40 of the electronic device and the mode set for the PCL 40 of the communication target device is stored in the connection mode 410b of the database 410.

In determining the service to be executed between the devices, the negotiation processing module 403 determines the service specified by the device for which the PCL 40 has been set to proactive mode as the service to be executed between the devices. Thus, if the PCL 40 of the communication target device is set to proactive mode, the negotiation processing module 403 determines the service specified by the communication target device as the service to be executed between the devices. Furthermore, if PCL 40 of the electronic device is set to proactive mode, the negotiation processing module 403 determines the service corresponding to the application specified by the user or a predetermined service as the service to be executed between the devices.

In the synchronization of the service, the negotiation processing module 403 executes a synchronization process for starting the service between the devices.

After the negotiation processing module 403 synchronizes (starts) the service, the service processing module 405 executes processing corresponding to the service determined by the negotiation processing module 403. The service processing module 405 appropriately controls the data communication module 201 and the application module 501 to allow the processing to be executed.

The standby processing module 406 executes a standby process from the completion of processing by the service processing module 403 until a start request for a new service is received. For example, upon receiving a service start request from the communication target device or if the user inputs a service start request, the standby processing module 406 ends the standby process. In response to the end of the standby process by the standby processing module 406, the negotiation processing module 403 starts a negotiation process again. That is, the standby processing module 406 does not request the negotiation processing module 403 to start a negotiation process from the completion of processing by the service processing module 405 until a service start request is received from the communication target device or from the completion of processing by the service processing module 405 until the user inputs a service start request. In other words, the standby processing module 406 waits for requesting the negotiation processing module 403 to start the negotiation process until receiving the service start request.

The application module 501 manages a plurality of applications (communication programs) transmitting and receiving data using close proximity wireless transfer. The application module 501 executes a process of notifying the close proximity wireless transfer control program 103a of a session start/end request from an application, and a process of controlling the close proximity wireless transfer control program 103a. The application is a communication program corresponding to an application protocol such as SCSI, OBEX, or any other general-purpose protocol.

Now, with reference to FIG. 4, an example of the appearance of the electronic device 10 will be described on the assumption that the electronic device 10 is implemented as a portable personal computer.

Figure 4:
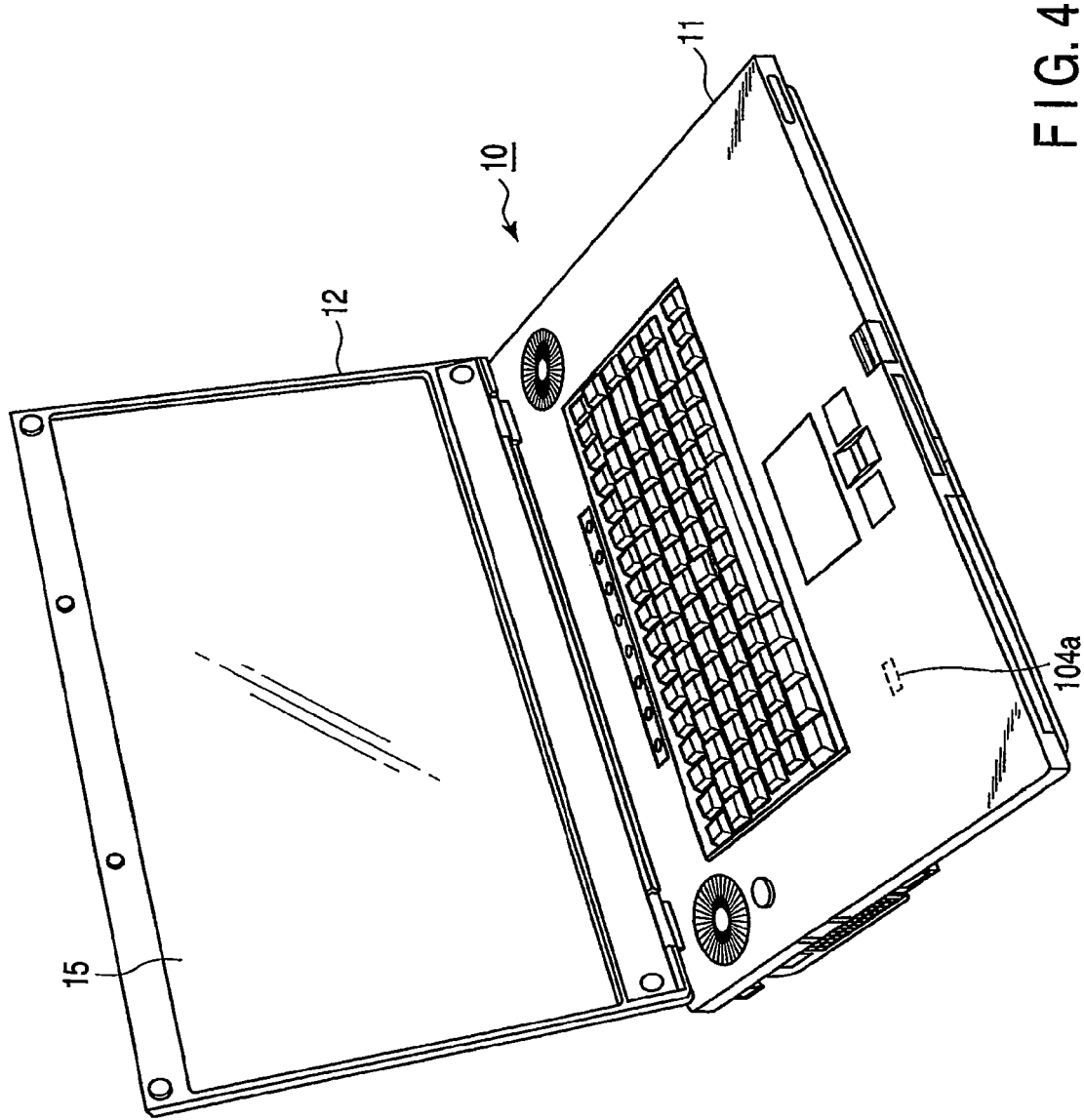
FIG. 4 is an exemplary perspective view showing the appearance of the electronic device according to the embodiment.

FIG. 4 is a perspective view showing the appearance of the electronic device 10.

The electronic device 10 includes a main body 11 and a display unit 12. The display unit 12 is attached to the main body 11 so as to be pivotal between an open position where the top surface of the main body 11 is exposed and a closed position where the top surface of the main body 11 is covered by the display unit 12. An LCD 15 is included in the display unit 12.

The main body 11 has a thin box shaped housing. A keyboard, a touchpad, a speaker, a power supply switch, and the like are arranged on the top surface of the housing of the main body 11.

The top surface of the main body 11, specifically, a part of the palm rest area on the top surface of the main body 11, functions as a communication surface. That is, the close proximity wireless transfer device 104 and the antenna (coupler) 104a are included in the main body 11 so as to be opposed to the top surface of the main body 11. The antenna (coupler) 104a is disposed so as to output a radio signal (induction electric field) to the outside via the top surface of the main body 11 (specifically, a part of the palm rest area on the top surface of the main body 11). A small area on the top surface of the main body 11 opposed to the antenna (coupler) 104a, that is, a small area on the top surface of the main body 11 located on the upper side of the antenna (coupler) 104a, is used as a communication position. The close proximity wireless transfer device 104 executes close proximity wireless transfer with the external device located within a predetermined range of communication (e.g. 3 cm) from the communication position on the top surface of the main body 11, via the top surface of the main body 11.

The user can start data transfer between the external device and the electronic apparatus 10 by performing, for example, an operation (also referred to as "touch operation") of bringing the external device having the close proximity wireless transfer function over the communication position on the top surface of the main body 11.

Figure 5:
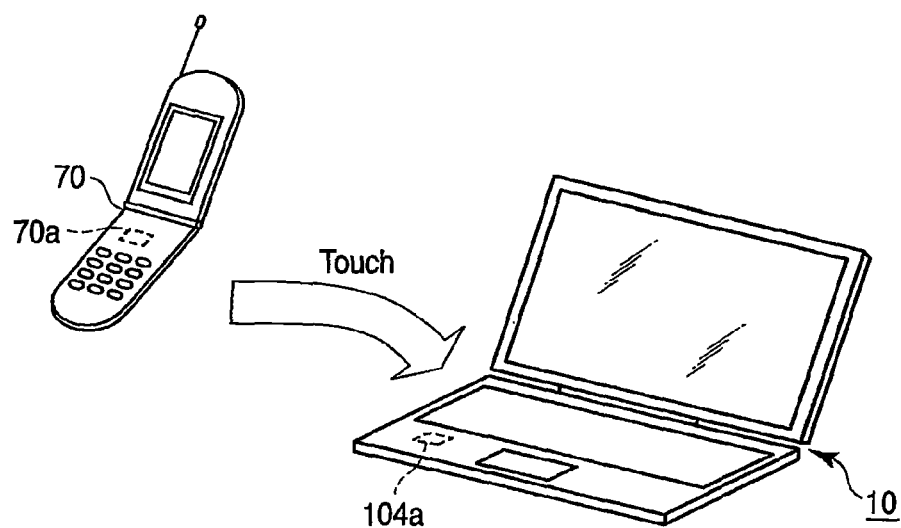
FIG. 5 is an exemplary diagram showing an example of close proximity wireless transfer performed between the electronic device according to the embodiment and an external device.

FIG. 5 illustrates close proximity wireless transfer executed between a mobile phone 70 and the electronic apparatus 10. An antenna (coupler) 70a for close proximity wireless transfer is provided within the housing of the mobile phone 70 so as to be opposed to the back surface of the housing. In this case, data transfer between the mobile phone 70 and electronic apparatus 10 can be started by bringing the back surface of the housing of the mobile phone 70 over the communication position on the top surface of the main body 11 (also referred to as "touch operation"). The connection between the mobile phone 70 and the electronic device 10 is executed in response to a trigger of bringing the mobile phone 70 and the electronic device 10 close to each other.

FIG. 6 is a sequence diagram showing an example of the close proximity wireless transfer between the devices. Here, it is assumed that device A set to proactive mode transmits a service start request to device B set to flexible mode. In the initial state, device A is set to reactive mode, and device B is set to flexible mode.

First, the user selects, on device A, an application program for close proximity wireless transfer. The user then brings device A close to device B (touch operation) to arrange devices A and B in a close proximity state (S101). Device A for which the application program has been selected changes from reactive mode, in which a service start request is received from the external device, to proactive mode, in which a service start request is transmitted to the external device.

Then, devices A and B execute a process (authentication process) required to establish a connection (CNL connection) between devices A and B (S102). For example, device A transmits a connection request. Upon receiving the connection request, device B transmits a response to the connection request, to device A. The above-described processing allows a connection to be established between device A and device B.

Devices A and B between which the connection has been established execute a negotiation process (S103). Devices A and B perform mode arbitration (S103a), service negotiation (S103b), and service synchronization (S103c) as a negotiation process.

Specifically, device B set to flexible mode performs mode arbitration to change the mode of device B according to the mode set for device A of the communication target device (S103a). Here, since device A is set to proactive mode, device B changes from flexible mode to reactive mode. Then, devices A and B perform service negotiation to determine a service to be executed between devices A and B (S103b). Here, the service specified by device A set to proactive mode, that is, the service corresponding to the application program selected by the user, is determined to be executed between devices A and B. Furthermore, devices A and B perform service synchronization in order to execute the determined service (S103c). Thus, the execution of the service is started between devices A and B.

When the above-described negotiation process is completed, the service is executed between devices A and B to perform communication such as transmission and reception of data (S104). When the execution of the service is completed, device A changes from proactive mode to reactive mode. Device B changes from reactive mode to flexible mode. Furthermore, devices A and B are disconnected from each other.

If devices A and B remain in the close proximity state after the disconnection, devices A and B execute an authentication process again (S105). When the connection between devices A and B is established through the authentication process, devices A and B execute a negotiation process (S106). The negotiation process is executed similarly to that carried out between S103a and S103c.

First, since device A is set to reactive mode, device B set to flexible mode changes from flexible mode to proactive mode. Then, devices A and B perform service negotiation to determine a service to be executed between devices A and B. Specifically, device B receives information indicative of services that can be provided by device A, from device A. Device B presents the user with a list of the services. The user selects a service to be utilized from the service list presented on device B. Device B transmits information indicative of the selected service to device A. Thus, the service selected by the user is determined to be executed between devices A and B. The service to be executed between devices A and B may be predetermined. Devices A and B perform service synchronization to start the execution of the determined service (S107).

As described above, if one of the connected devices is set to flexible mode, the service determined by the negotiation is executed. When the execution of the service is completed and the devices are disconnected from each other, a connection is established between the devices again, for example, after a predetermined time has elapsed. Furthermore, a negotiation process is executed again, and the execution of a new service is started without the user's instruction to start the new service.

Figure 7:
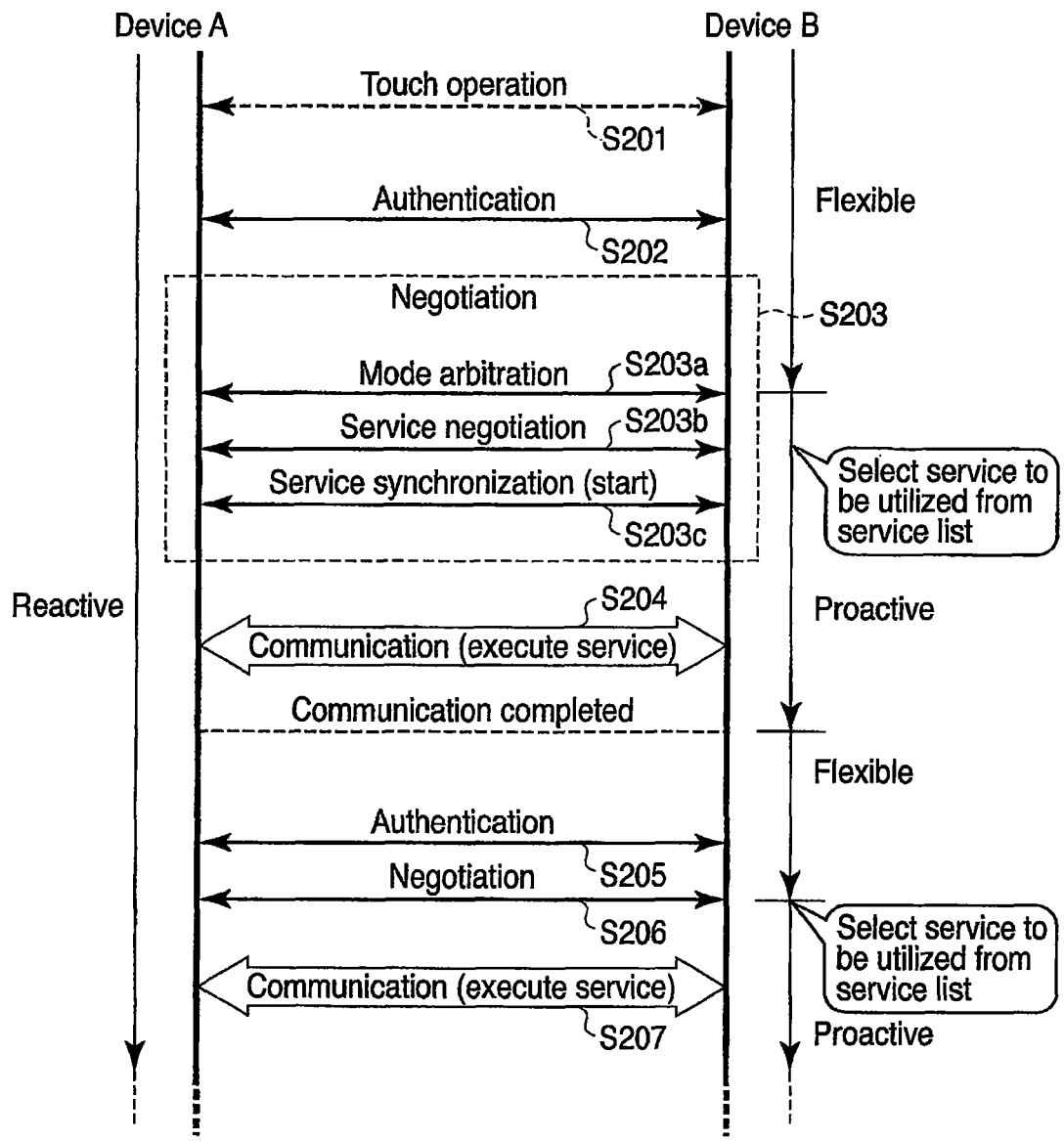
FIG. 7 is an exemplary sequence diagram showing another example of the close proximity wireless transfer between the devices.

FIG. 7 is a sequence diagram showing another example of the close proximity wireless transfer between the devices. Here, it is assumed that device B set to flexible mode transmits a service start request to device A set to reactive mode. In the initial state, device A is set to reactive mode, and device B is set to flexible mode.

First, the user brings device A close to device B (touch operation) to arrange devices A and B in a close proximity state (S201). Then, devices A and B execute a process (authentication process) required to establish a connection (CNL connection) between devices A and B (S202). For example, device B transmits a connection request. Upon receiving the connection request, device A transmits a response to the connection request, to device B. The above-described processing allows a connection to be established between device A and device B.

Devices A and B between which the connection has been established execute a negotiation process (S203). Devices A and B perform mode arbitration (S203a), service negotiation (S203b), and service synchronization (S203c) as a negotiation process.

Specifically, device B set to flexible mode performs mode arbitration to change the mode of device B according to the mode set for device A of the communication target device (S203a). Here, since device A is set to reactive mode, device B changes from flexible mode to proactive mode. Then, devices A and B perform service negotiation to determine a service to be executed between devices A and B (S203b). Specifically, device B requests device A to transmit information indicative of services that can be provided by device A.

Device B presents the user with a list of the services. The user selects a service to be utilized from the presented service list. Thus, the service selected by the user is determined to be executed between devices A and B. The service to be executed between devices A and B may be predetermined. Then, devices A and B perform service synchronization to start the execution of the determined service (S203c). Thus, the execution of the service is started between devices A and B.

When the above-described negotiation process is completed, the service is executed between devices A and B to perform communication such as transmission and reception of data (S204). When the execution of the service is completed, device B changes from proactive mode to flexible mode. Furthermore, devices A and B are disconnected from each other.

If devices A and B remain in the close proximity state after the disconnection, devices A and B execute an authentication process again (S205). When the connection between devices A and B is established through the authentication process, devices A and B execute a negotiation process (S206). The negotiation process is executed similarly to that between S203a and S203c. Then, the service determined by the negotiation process is executed between devices A and B (S207).

As is the case with the sequence diagram shown in FIG. 6, if one of the connected devices is set to flexible mode, the service determined by the negotiation process is executed. When the execution of the service is completed and the devices are disconnected from each other, a connection is established between the devices again, for example, after a predetermined time has elapsed. Furthermore, a negotiation process is executed again, and the execution of a new service is started without the user's instruction to start the new service.

In the sequence diagrams shown in FIGS. 6 and 7, if one of the devices to be connected is set to flexible mode, the user can start execution of a service between devices A and B simply by placing device A close to device B. That is, arranging devices A and B in a close proximity state allows an authentication process and a negotiation process to be automatically executed between the devices. Thus, the execution of the service can be started between the devices.

If the execution of a service is automatically started as described above, time and effort required for the user's operation can be avoided. However, the execution of a service may also be started when the devices are simply left in the close proximity state. Thus, a service unexpected by the user may be executed. For example, after a service corresponding to an application specified by the user is executed between the devices arranged in the close proximity state, the execution of a new service may be started between the devices left in the close proximity state. In another case, a service list prompting the user to start a new service may be presented to the user. In this case, the user has to perform an operation of stopping the started execution of the new service. This operation is inconvenient for the user. Thus, the devices have to be controlled such that the execution of a service is started only when the user issues a service start request.

FIGS. 8 to 11 are sequence diagrams showing examples of the close proximity wireless transfer between the electronic device 10 and the external device. The electronic device 10 according to the present embodiment controls the close proximity wireless transfer device 104 so that the execution of a service is started when the user issues a service start request.

Figure 8:
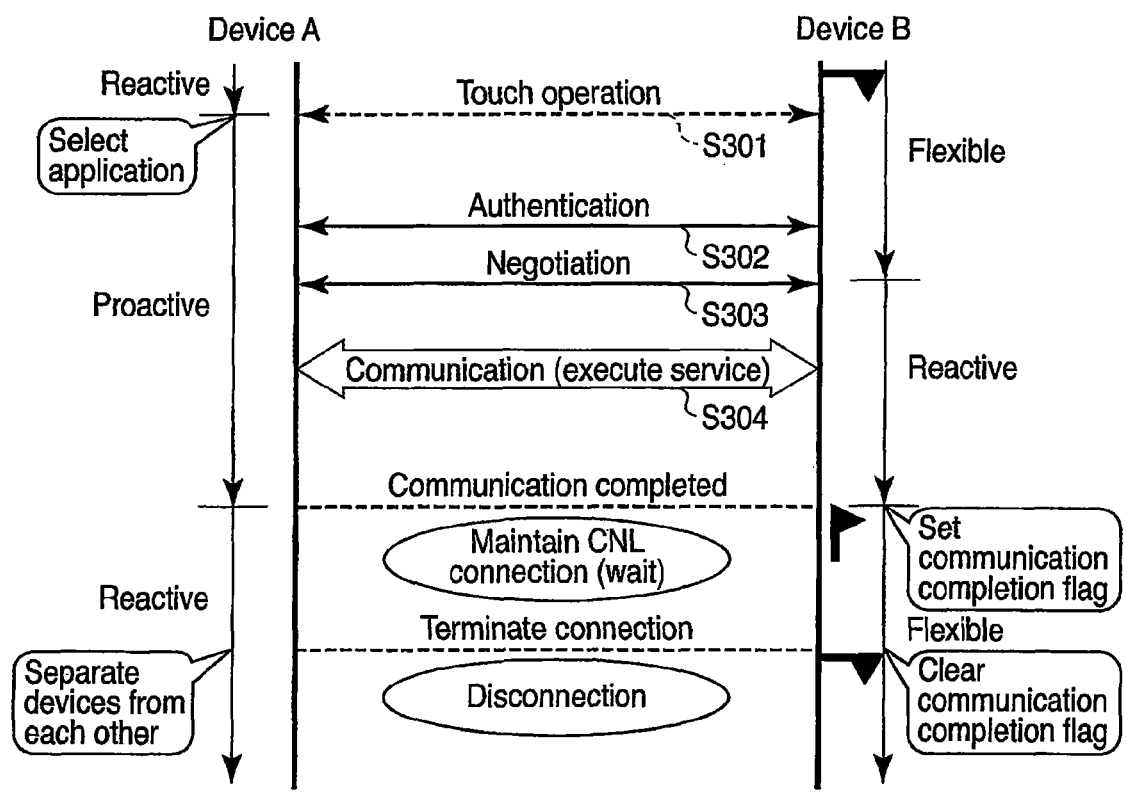
FIG. 8 is an exemplary diagram showing an example of close proximity wireless transfer performed between the electronic device of the embodiment and an external device.

FIG. 8 is a sequence diagram showing that communication is disconnected after one service executed between the devices has been completed. Here, it is assumed that device A set to proactive mode transmits a service start request to device B set to flexible mode. In the initial state, device A is set to reactive mode, and device B is set to flexible mode. Furthermore, in device B, the communication completion flag indicating that the execution of a service between the devices has been completed is cleared (reset state).

First, the user selects, on device A, an application program for close proximity wireless transfer. The user then brings device A close to device B (touch operation) to arrange devices A and B in a close proximity state (S301). Device A for which the application program has been selected changes from reactive mode, in which a service start request is received from the external device, to proactive mode, in which a service start request is transmitted to the external device.

Then, devices A and B execute a process (authentication process) required to establish a connection (CNL connection) between devices A and B (S302). For example, device A transmits a connection request. Upon receiving the connection request, device B transmits a response to the connection request, to device A. The above-described processing allows a connection to be established between device A and device B.

Devices A and B between which the connection has been established execute a negotiation process (S303). In the negotiation process, devices A and B perform mode arbitration, service negotiation, and service synchronization as is the case with the processing between S103a and S103c in FIG. 6.

Specifically, device B set to flexible mode performs mode arbitration so as to change the mode of device B according to the mode set for device A of the communication target device. Here, since device A is set to proactive mode, device B changes from flexible mode to reactive mode. Then, devices A and B perform service negotiation so as to determine a service to be executed between devices A and B. Here, the service specified by device A set to proactive mode, that is, the service corresponding to the application program selected by the user, is determined to be executed between devices A and B. Furthermore, devices A and B perform service synchronization in order to execute the determined service. Thus, the execution of the service is started between devices A and B.

When the above-described negotiation process is completed, the service is executed between devices A and B to perform communication such as transmission and reception of data (S304). When the execution of the service is completed, device A changes from proactive mode to reactive mode. Device B changes from reactive mode to flexible mode. Furthermore, device B sets the communication completion flag indicating that the execution of the service has been completed (flag set). The connection (CNL connection) between devices A and B is maintained.

While the communication completion flag is set, device B executes a standby process of waiting for processing that allows the execution of a new service to be started. In other words, while the communication completion flag is set, device B is in the wait state in which device B waits for the execution of a new service to be started.

If devices A and B are separated from each other so that they are no longer in the close proximity state, devices A and B are disconnected from each other. In response to the disconnection between devices A and B, device B clears the communication completion flag.

According to the above-described processing, the execution of an unexpected service can be prevented from being started from the completion of execution of a service between the devices until the devices are separated from each other (the devices are no longer in the close proximity state).

Figure 9:
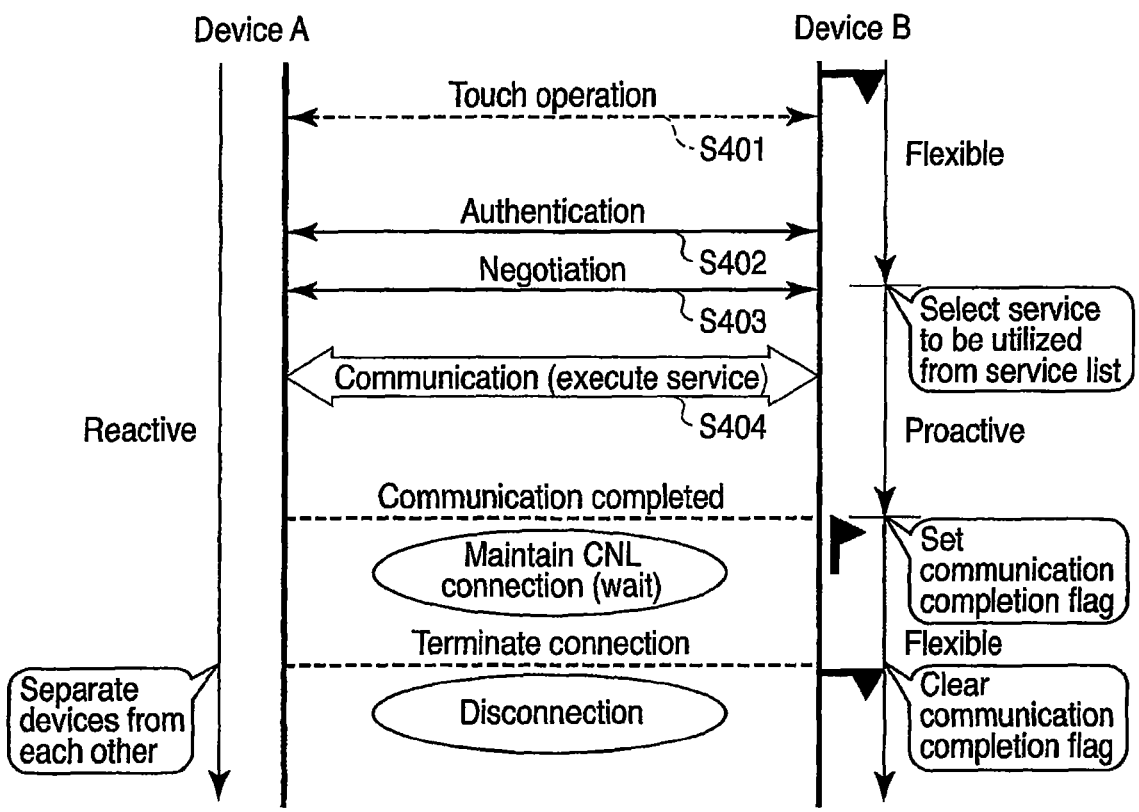
FIG. 9 is an exemplary diagram showing another example of the close proximity wireless transfer performed between the electronic device of the embodiment and the external device.

FIG. 9 is another sequence diagram showing that communication is disconnected after one service executed between the devices has been completed. Here, it is assumed that device B set to flexible mode transmits a service start request to device A set to reactive mode. In the initial state, device A is set to reactive mode, and device B is set to flexible mode. Furthermore, in device B, the communication completion flag indicating that the execution of a service between the devices has been completed is cleared.

First, the user places device A close to device B (touch operation) to arrange devices A and B in a close proximity state (S401). Then, devices A and B execute a process (authentication process) required to establish a connection (CNL connection) between devices A and B (S402). For example, device B transmits a connection request. Upon receiving the connection request, device A transmits a response to the connection request, to device B. The above-described processing allows a connection to be established between device A and device B.

Devices A and B between which the connection has been established execute a negotiation process (S403). In the negotiation process, devices A and B perform mode arbitration, service negotiation, and service synchronization as is the case with the processing between S203a and S203c in FIG. 7.

Specifically, device B set to flexible mode performs mode arbitration to change the mode of device B according to the mode set for device A of the communication target device. Here, since device A is set to reactive mode, device B changes from flexible mode to proactive mode. Then, devices A and B perform service negotiation to determine a service to be executed between devices A and B. Specifically, device B requests device A to transmit information indicative of services that can be provided by device A. Upon receiving the information indicative of the services that can be provided by device A, device B presents the user with a list of the services. The user selects a service to be utilized from the presented service list. Thus, the service to be executed between devices A and B is determined. The service to be executed between devices A and B may be predetermined. Then, devices A and B perform service synchronization to start the execution of the determined service. Thus, the execution of the service is started between devices A and B.

When the above-described negotiation process is completed, the service is executed between devices A and B to perform communication such as transmission and reception of data (S404). When the execution of the service is completed, device B changes from proactive mode to flexible mode. Furthermore, device B sets the communication completion flag indicating that the execution of the service has been completed. Devices A and B remain connected together (CNL connection).

While the communication completion flag is set, device B executes a standby process of waiting for processing that allows the execution of a new service to be started. In other words, while the communication completion flag is set, device B is in the wait state in which device B waits for the execution of a new service to be started.

If devices A and B are separated from each other so that they are no longer in the close proximity state, devices A and B are disconnected from each other. In response to the disconnection between devices A and B, device B clears the communication completion flag.

According to the above-described processing, the execution of an unexpected service can be prevented from being started from the completion of execution of a service between the devices until the devices are separated from each other (the devices are no longer in the close proximity state).

Figure 10:
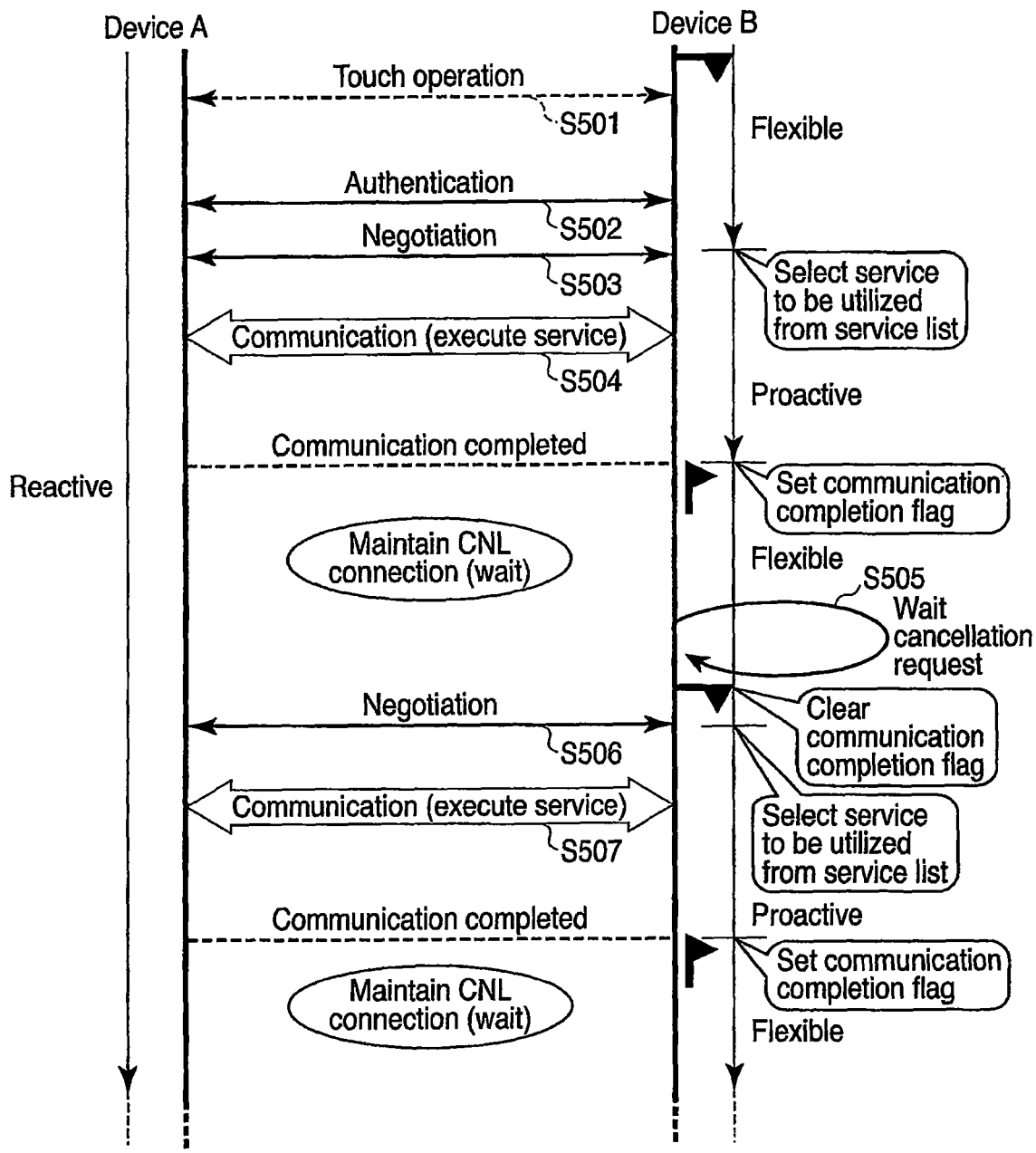
FIG. 10 is an exemplary diagram showing yet another example of the close proximity wireless transfer performed between the electronic device of the embodiment and the external device.

FIG. 10 is a sequence diagram showing that after one service executed between the devices is completed, a new service is provided in response to the user's request. Here, it is assumed that device B set to flexible mode transmits a service start request to device A set to reactive mode. In the initial state, device A is set to reactive mode, and device B is set to flexible mode. Furthermore, in device B, the communication completion flag indicating that the execution of a service between the devices has been completed is cleared.

First, the user places device A close to device B (touch operation) to arrange devices A and B in a close proximity state (S501). Then, devices A and B execute a process (authentication process) required to establish a connection (CNL connection) between devices A and B (S502). For example, device B transmits a connection request. Upon receiving the connection request, device A transmits a response to the connection request, to device B. The above-described processing allows a connection to be established between device A and device B.

Devices A and B between which the connection has been established execute a negotiation process (S503). In the negotiation process, devices A and B perform mode arbitration, service negotiation, and service synchronization as is the case with the processing between S203a and S203c in FIG. 7.

Specifically, device B set to flexible mode performs mode arbitration to change the mode of device B according to the mode set for device A of the communication target device. Here, since device A is set to reactive mode, device B changes from flexible mode to proactive mode. Then, devices A and B perform service negotiation to determine a service to be executed between devices A and B. Specifically, device B requests device A to transmit information indicative of services that can be provided by device A. Upon receiving the information indicative of the services that can be provided by device A, device B presents the user with a list of the services. The user selects a service to be utilized from the presented service list. Thus, the service to be executed between devices A and B is determined. The service to be executed between devices A and B may be predetermined. Then, devices A and B perform service synchronization to start the execution of the determined service. Thus, the execution of the service is started between devices A and B.

When the above-described negotiation process is completed, the service is executed between devices A and B to perform communication such as transmission and reception of data (S504). When the execution of the service is completed, device B changes from proactive mode to flexible mode. Furthermore, device B sets the communication completion flag indicating that the execution of the service has been completed. The connection (CNL connection) between devices A and B is maintained.

While the communication completion flag is set, device B executes a standby process of waiting for processing that allows the execution of a new service to be started. In other words, while the communication completion flag is set, device B is in the wait state in which device B waits for the execution of a new service to be started.

If the user inputs a wait cancellation request while the communication completion flag is set, device B cancels the wait state of device B in response to the wait cancellation request (S505). Furthermore, device B clears the communication completion flag. The user inputs the wait cancellation request by, for example, selecting an application.

Devices A and B execute a negotiation process again (S506). The negotiation process is executed similarly to that carried out in S503. Thus, devices A and B perform mode arbitration, service negotiation, and service synchronization.

When the negotiation process is completed, the service is executed between devices A and B to perform communication such as transmission and reception of data (S507). When the execution of the service is completed, device B changes from proactive mode to flexible mode. Furthermore, device B sets the communication completion flag indicating that the execution of the service has been completed. The connection (CNL connection) between devices A and B is maintained.

According to the above-described processing, the execution of an unexpected service can be prevented from being started from the completion of execution of a service between the devices until the user inputs a wait cancellation request on device B. In other words, after the execution of a service between the devices is completed, the execution of a service can be started in response to the user's input of a service start request.

FIG. 11 is another sequence diagram showing that after one service executed between the devices is completed, a new service is provided in response to the user's request. Here, it is assumed that device A set to proactive mode transmits a service start request to device B set to flexible mode. In the initial state, device A is set to reactive mode, and device B is set to flexible mode. Furthermore, in device B, the communication completion flag indicating that the execution of a service between the devices has been completed is cleared.

First, the user selects, on device A, an application program for close proximity wireless transfer. The user then places device A close to device B (touch operation) to arrange devices A and B in a close proximity state (S601). Device A for which the application program has been selected changes from reactive mode, in which a service start request is received from the external device, to proactive mode, in which a service start request is transmitted to the external device.

Then, devices A and B execute a process (authentication process) required to establish a connection (CNL connection) between devices A and B (S602). For example, device A transmits a connection request. Upon receiving the connection request, device B transmits a response to the connection request, to device A. The above-described processing allows a connection to be established between device A and device B.

Devices A and B between which the connection has been established execute a negotiation process (S603). In the negotiation process, devices A and B perform mode arbitration, service negotiation, and service synchronization as is the case with the processing between S103a and S103c in FIG. 6.

Specifically, device B set to flexible mode performs mode arbitration to change the mode of device B according to the mode set for device A of the communication target device. Here, since device A is set to proactive mode, device B changes from flexible mode to reactive mode. Then, devices A and B perform service negotiation to determine a service to be executed between devices A and B. Here, the service specified by device A set to proactive mode, that is, the service corresponding to the application program selected by the user, is determined to be executed between devices A and B. Furthermore, devices A and B perform service synchronization in order to execute the determined service. Thus, the execution of the service is started between devices A and B.

When the above-described negotiation process is completed, the service is executed between devices A and B to perform communication such as transmission and reception of data (S604). When the execution of the service is completed, device A changes from proactive mode to reactive mode. Furthermore, device B sets the communication completion flag indicating that the execution of the service has been completed. The connection (CNL connection) between devices A and B is maintained.

While the communication completion flag is set, device B executes a standby process of waiting for processing that allows the execution of a new service to be started. In other words, while the communication completion flag is set, device B is in the wait state in which device B waits for the execution of a new service to be started.

When the user selects, on device A, an application program for close proximity wireless transfer while the communication completion flag is set, device A transmits a service start request to device B (S605). Device B cancels the wait state of device B in response to the service start request received from device A. Furthermore, device B clears the communication completion flag. Devices A and B execute a negotiation process again (S606). The negotiation process is executed similarly to that carried out in S603. Thus, devices A and B perform mode arbitration, service negotiation, and service synchronization.

When the negotiation process is completed, the service is executed between devices A and B to perform communication such as transmission and reception of data (S607). Device A changes from proactive mode to reactive mode. Device B changes from reactive mode to flexible mode. Furthermore, device B sets the communication completion flag indicating that the execution of the service has been completed. The connection (CNL connection) between devices A and B is maintained.

According to the above-described processing, the execution of an unexpected service can be prevented from being started from the completion of execution of a service between the devices until device B receives a service start request from device A. In other words, after the execution of a service between the devices is completed, the execution of a service can be started in response to the user's input of a service start request.

FIG. 12 is a state transition diagram showing an example of the state transition of close proximity wireless transfer performed by the electronic device 10.

When set to the state in which the electronic device 10 is arranged in proximity of the external device, the electronic device 10 changes from a disconnected state 60 in which the CNL connection is disconnected to a CNL connection established state 61 in which the CNL connection is established. The CNL connection established state 61 is defined to be further classified into a negotiation state 611, a service execution state 612, and a wait state 613. That is, during the CNL connection established state 61, the electronic device 10 changes among the negotiation state 611, the service execution state 612, and the wait state 613.

When the electronic device 10 has changed from the disconnected state 60 to the CNL connection established state 61, the electronic device 10 is first set to the negotiation state 611. In the negotiation state 611, as described above, a negotiation process including mode arbitration, service negotiation, and service synchronization is executed. In response to the completion of the negotiation process, the electronic device 10 changes from the negotiation state 611 to the service execution state 612.

In the service execution state 612, processing corresponding to a service determined by the negotiation process is executed. Then, in response to the completion of the execution of the service, the electronic device 10 changes from the service execution state 612 to the wait state 613.

In the wait state 613, a standby process is executed which waits for the service to be started until an event occurs such as the user's input (a request from a high-level application) of a service start request (wait cancellation request) or the reception of a service start request from an external device. Thus, in response to the user's input of a service start request or the reception of a service start request from the external device, the electronic device 10 changes from the wait state 613 to the negotiation state 611.

While the electronic device 10 is in the CNL connection established state 61, that is, in one of the negotiation state 611, the service execution state 612, and the wait state 613, if the electronic device 10 and the external device are separated so they are no longer in the close proximity state, the electronic device 10 and the external device are disconnected from each other. The electronic device 10 changes to the disconnected state 60.

As described above, the electronic device 10 executes a service specified in the service execution state 612, and then changes to the wait state 613. In the wait state 613, the electronic device 10 wait for the execution of a negotiation process required to start a new service until the user or the external device issues a service start request. Thus, the execution of an unexpected service can be prevented from being started between the devices arranged in a close proximity state. The standby process based on the communication completion flag as described with reference to FIGS. 8 to 11 may be executed based on a state transition as shown in FIG. 12. In this case, the electronic device 10 manages the transition of the state of the close proximity wireless transfer with the communication target device. The electronic device 10 thus executes processing that corresponds to each of the states. If the electronic device 10 changes to the wait state 613, then by executing a standby process of waiting for processing to be carried out to start a new service, effects are exerted which are similar to those produced by executing a standby process based on the communication completion flag.

Now, with reference to FIG. 13, the relationship between the mode set for the PCL 40 of each device and the service executed between the devices will be described. Here, it is assumed that a service is executed between device A and device B. The protocol conversion layer 40 of device A and the protocol conversion layer 40 of device B are set to one of proactive mode, flexible mode, and reactive mode.

First, the case where device A is set to proactive mode will be described.

If both devices A and B are set to proactive mode, each of devices A and B transmits a service start request to the communication target device but fails to respond to a service start request from the communication target request. Thus, the service fails to be started between devices A and B, resulting in an error.

If device A is set to proactive mode and device B is set to flexible mode, each of devices A and B transmits a service start request to the communication target device. Furthermore, device B set to flexible mode receives the service start request from device A, and changes from flexible mode to reactive mode. Device B then returns a response to the service start request to device A. Thus, the service specified by device A set to proactive mode is executed between devices A and B.

If device A is set to proactive mode and device B is set to reactive mode, device A transmits a service start request to the communication target device. Furthermore, device B set to reactive mode receives the service start request from device A, and returns a response to the service start request to device A. Thus, the service specified by device A set to proactive mode is executed between devices A and B.

Now, the case where device A is set to flexible mode will be described.

If device A is set to flexible mode and device B is set to proactive mode, each of devices A and B transmits a service start request to the communication target device. Furthermore, device A set to flexible mode receives the service start request from device B, and changes from flexible mode to reactive mode. Device A then returns a response to the service start request to device B. Thus, the service specified by device B set to proactive mode is executed between devices A and B.

If both devices A and B are set to flexible mode, each of devices A and B transmits a service start request to the communication target device. However, since each of the devices is set to flexible mode and the communication target device is also set to flexible mode, the service is not started between devices A and B, resulting in an error.

If device A is set to flexible mode and device B is set to reactive mode, device A transmits a service start request to the communication target device. Device B set to reactive mode receives the service start request from device A, and returns a response to the service start request to device A. Device A changes from flexible mode to proactive mode. The service pre-specified by device A set to proactive mode is executed between devices A and B. Alternatively, a list of services that can be executed by device B can be presented to the user on device A so that the user can select a service to be executed between the devices.

Finally, the case where device A is set to reactive mode will be described.

If device A is set to reactive mode and device B is set to proactive mode, device B transmits a service start request to the communication target device. Device A set to reactive mode receives the service start request from device B, and returns a response to the service start request to device B. Thus, the service specified by device B set to proactive mode is executed between devices A and B.

If device A is set to reactive mode and device B is set to flexible mode, device B transmits a service start request to the communication target device. Device A set to reactive mode receives the service start request from device B, and returns a response to the service start request to device B. Device B changes from flexible mode to proactive mode. The service pre-specified by device B set to proactive mode is executed between devices A and B. Alternatively, a list of services that can be executed by device A can be presented to the user on device B so that the user can select a service to be executed between the devices.

If device A is set to reactive mode and device B is set to reactive mode, neither of devices A and B transmits a service start request to the communication target device. Thus, no service is executed between devices A and B.

Now, with reference to the flowchart in FIG. 14, an example of the procedure of a communication process according to the close proximity wireless transfer scheme will be described.

First, the electronic device 10 determines whether a touch operation has been performed to place the electronic device 10 close to the external device (block B701). Specifically, the electronic device 10 transmits a connection request to the external device and then determines whether the electronic device 10 receives a response to the connection request from the external device, or determines whether the electronic device 10 receives a connection request from the external device.

If a touch operation is performed to place the electronic device 10 close to the external device (YES in block B701), the electronic device 10 executes an authentication process with the external device (block B702). The electronic device 10 identifies the external device as the communication target device. The electronic device 10 then executes a negotiation process with the external device (block B703). In the negotiation process, the electronic device 10 executes processing for mode arbitration, service negotiation, and service synchronization. Specifically, the electronic device 10 controls a mode to be set for the PCL 40 through the mode arbitration. Furthermore, the electronic device 10 determines a service to be executed between itself and the external device and then starts the service.

When the negotiation process is completed, the electronic device 10 executes the service determined by the negotiation process (block B704).

Then, the electronic device 10 determines whether the service executed between itself and the external device has been completed (block B705). If the service executed between the electronic device 10 and the external device has been completed (YES in block B705), the electronic device 10 repeats block 8702 and the following processing. That is, while the electronic device 10 and the external device are arranged in a close proximity state, the execution of a service is repeated between the electronic device 10 and the external device.

Figure 15:
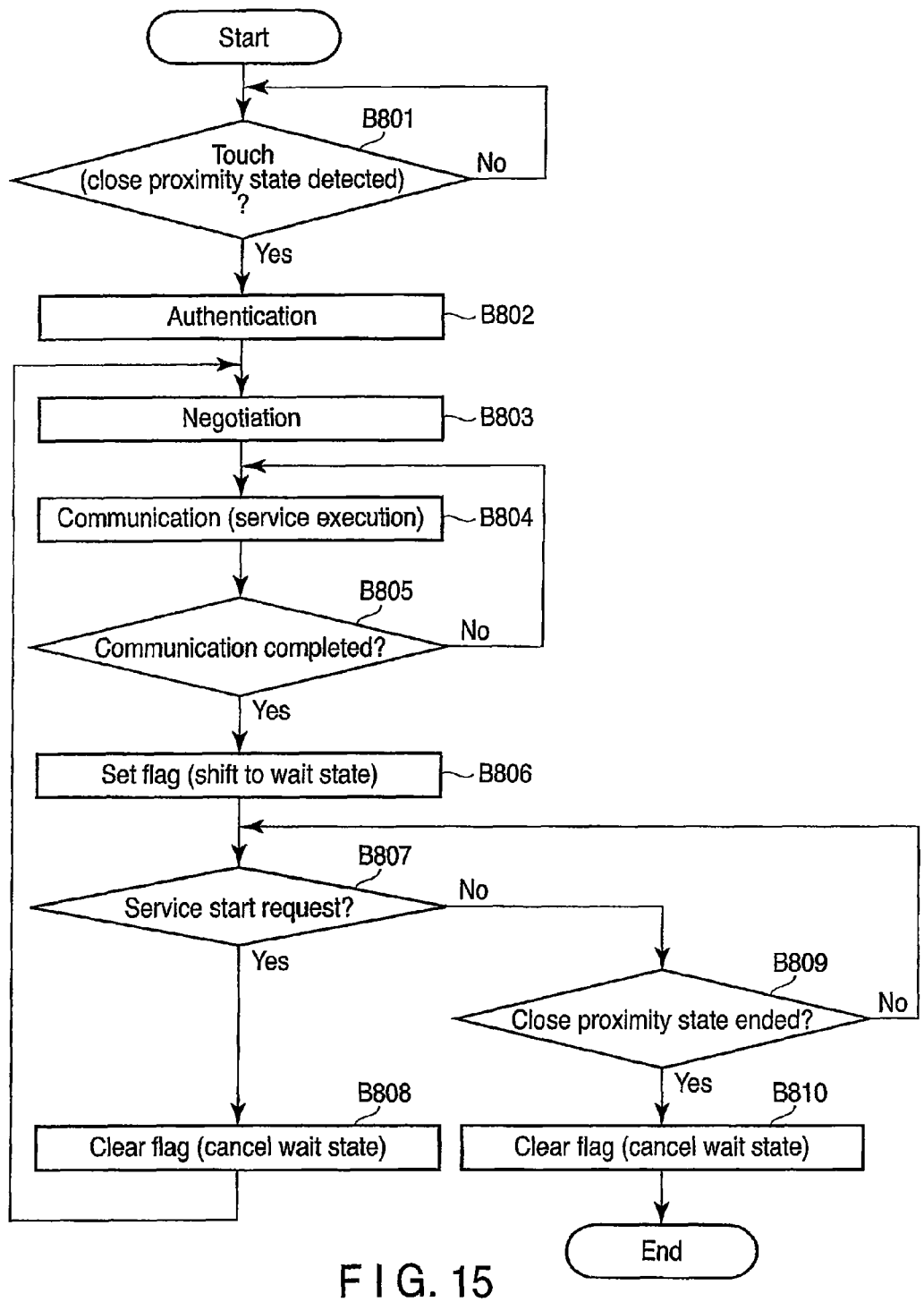
FIG. 15 is an exemplary flowchart showing the procedure of a close proximity wireless transfer process executed by the electronic device according to the embodiment.

The above-described processing allows a service to be repeatedly executed between the devices arranged in the close proximity state. That is, if the execution of a new service is automatically started after one service is completed, time and effort required for the user's operation can be avoided. However, the execution of a service may also be started when the devices are simply left in the close proximity state. Thus, an unexpected service may be executed. FIG. 15 is a flowchart showing an example of the procedure of a communication process executed if the close proximity wireless transfer device 104 is controlled to start the execution of a service only when a service start request has been issued.

First, the electronic device 10 determines whether a touch operation has been performed to place the electronic device 10 close to the external device (block B801). Specifically, the electronic device 10 transmits a connection request to the external device and then determines whether the electronic device 10 receives a response to the connection request from the external device, or determines whether the electronic device 10 receives a connection request from the external device.

If a touch operation is performed to place the electronic device 10 close to the external device (YES in block B801), the electronic device 10 executes an authentication process with the external device (block B802). The electronic device 10 identifies the external device of the communication target device. The electronic device 10 then executes a negotiation process with the external device (block B803). In the negotiation process, the electronic device 10 executes processing for mode arbitration, service negotiation, and service synchronization. Specifically, the electronic device 10 controls a mode to be set for the PCL 40 through the mode arbitration. Furthermore, the electronic device 10 determines a service to be executed between itself and the external device and then starts the service.

When the negotiation process is completed, the electronic device 10 executes the service determined by the negotiation process (block B804).

Then, the electronic device 10 determines whether the service executed between itself and the external device has been completed (block B805). If the service executed between the electronic device 10 and the external device has been completed (YES in block B805), the electronic device 10 sets a flag indicative of the completion of the service (block B806). That is, the electronic device 10 changes to the wait state, in which the electronic device 10 waits for processing to be executed to start a new service.

After changing to the wait state, the electronic device 10 determines whether a service start request event has occurred in which the start of a new service is requested (block B807). A service start request event occurs, for example, when the user inputs a service start request or when a service start request is received from the external device.

If a service start request event has occurred (YES in block B807), the electronic device 10 clears the flag (block B808). The electronic device 10 then cancels the wait state, and executes processing required to start a new service. That is, the electronic device 10 executes block B803 and the following processing.

If a service start request event has not occurred (NO in block B807), the electronic device 10 determines whether the electronic device 10 and the external device are no longer in the close proximity state (block B809). Specifically, the electronic device 10 determines whether the CNL connection established between itself and the communication target device has been terminated. If the electronic device 10 and the communication target device are in a close proximity state (NO in block B809), the electronic device 10 executes block B807 and the following processing. If the electronic device 10 and the communication target device are no longer in the close proximity state (YES in block B809), the electronic device 10 clears the flag and cancels the wait state (block B810).

In the above-described processing, after the execution of one service between the devices is completed, the execution of a new service is started only when the user issues a service start request. Thus, the start of an unexpected service can be prevented.

As described above, the present embodiment allows the execution of an unexpected service to be prevented. When the electronic device 10 and the external device are arranged in the close proximity state, the electronic device 10 establishes a CNL connection with the external device. The electronic device 10 further executes a negotiation process in order to start the execution of a service. When the execution of the service is completed, the electronic device 10 changes to the wait state to wait for a service start request input by the user or transmitted by the external device. Then, in response to the input (reception) of the service start request, the electronic device 10 executes processing required to start a new service. In the above-described processing, after the execution of one service is completed, the execution of a new service automatically started without the user's instruction, that is, the execution of an unexpected service can be prevented.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a communication module configured to execute close proximity wireless transfer, the communication module being in one of multiple modes including a first mode, a second mode and a third mode, wherein in the first mode, a service start request is transmitted to a communication target device, in the second mode, a service start request is received from the communication target device, and in the third mode, the mode is allowed to be changed to either the first mode or the second mode;

a connection establishment module configured to establish a connection between the communication module and an external device when the communication module and the external device are in a close proximity state;

a negotiation module configured to execute, if the connection between the communication module and the external device is established, a negotiation process comprising a process of determining whether the external device is in the first mode or in the second mode, a process including changing a mode of the communication module from the third mode to the second mode, receiving the service start request from the external device, and determining a service to be executed between the communication module and the external device, if the external device is in the first mode, and a process including changing the mode of the communication module from the third mode to the first mode, transmitting the service start request to the external device, and determining a service to be executed between the communication module and the external device, if the external device is in the second mode;

a service execution module configured to execute the determined service; and an execution control module configured to change the mode of the communication module from the first mode or the second mode to the third mode after completion of the execution of the service, and to not request execution of the negotiation process again unless a start request for a new service is received from a user the external device.

2. The electronic device of claim 1, wherein the negotiation module is configured to change the mode of the communication module from the third mode to the first mode, to transmit the service start request to the external device, to receive information indicative of services that are allowed to be executed by the external device, and to determine a service selected from the services as the service to be executed between the communication module and the external device, if the external device is in the second mode, and the execution control module is configured to change the mode of the communication module from the first mode to the third mode after completion of the execution of the service, and to not request execution of the negotiation process again unless a start request for a new service is received from the user or the external device.

3. The electronic device of claim 1, wherein the negotiation module is configured to change the mode of the communication module from the third mode to the second mode, to receive a service start request from the external device, to receive information indicative of a service specified by the external device, and to determine the service to be executed between the communication module and the external device, if the external device is in the first mode, and the execution control module is configured to change the mode of the communication module from the second mode to the third mode after completion of the execution of the service, and to not request execution of the negotiation process again unless a start request for a new service is received from the user or the external device.

4. The electronic device of claim 1, wherein the negotiation module is configured to change the mode of the communication module from the third mode to the first mode in response to receiving the user's start request, to transmit a service start request to the external device, and to determine a service specified in the user's start request as the service to be executed between the communication module and the external device, and the execution control module is configured to change the mode of the communication module from the first mode to the third mode after completion of the execution of the determined service, and to not request execution of the negotiation process again unless a start request for a new service is received from the user or the external device.

5. The electronic device of claim 1, further comprising a flag setting module configured to set a flag indicative of the completion if the execution of the determined service is completed and to reset the flag in response to receiving the start request for the new service from the user or the external device, wherein the execution control module is configured to execute the negotiation process again in response to the resetting of the flag.

6. The electronic device of claim 1, wherein the execution control module is configured to maintain the mode of the communication module in the third mode until the start request for the new service is received from the user or the external device.

7. A communication control method of controlling communication between an external device and an electronic apparatus comprising a communication module configured to execute close proximity wireless transfer, the communication module being in one of multiple modes including a first mode, a second mode and a third mode, wherein in the first mode, a service start request is transmitted to a communication target device, in the second mode, a service start request is received from the communication target device, and in the third mode, the mode is allowed to be changed to either the first mode or the second mode, the method comprising:

establishing a connection between the communication module and the external device when the communication module and the external device are in a close proximity state;

executing, if the connection between the communication module and the external device is established, a negotiation process comprising a process of determining whether the external device is in the first mode or in the second mode, a process including changing a mode of the communication module from the third mode to the second mode, receiving the service start request from the external device, and determining a service to be executed between the communication module and the external device, if the external device is in the first mode, and a process including changing the mode of the communication module from the third mode to the first mode, transmitting the service start request to the external device, and determining a service to be executed between the communication module and the external device, if the external device is in the second mode;

executing the determined service; and changing the mode of the communication module from the first mode or the second mode to the third mode after completion of the execution of the service, and not requesting execution of the negotiation process again unless a start request for a new service is received from a user or the external device.

* * * * *